(12) United States Patent
Yatagai et al.

(10) Patent No.: US 7,036,619 B2
(45) Date of Patent: May 2, 2006

(54) SNOWMOBILE FOUR-CYCLE ENGINE ARRANGEMENT

(75) Inventors: Yasuaki Yatagai, Hamamatsu (JP); Hitoshi Matsumura, Hamamatsu (JP); Hiroaki Shichi, Hamamatsu (JP)

(73) Assignee: Suzuki Motor Corporation, Shizoka-ken (JP)

( * ) Notice: Subject to any disclaimer, the term of this patent is extended or adjusted under 35 U.S.C. 154(b) by 0 days.

(21) Appl. No.: 10/365,417

(22) Filed: Feb. 13, 2003

(65) Prior Publication Data

US 2003/0146032 A1 Aug. 7, 2003

Related U.S. Application Data

(62) Division of application No. 09/925,522, filed on Aug. 10, 2001, now Pat. No. 6,561,297.

(30) Foreign Application Priority Data

Sep. 6, 2000 (JP) .............................. 2000-270363
Sep. 20, 2000 (JP) .............................. 2000-285417

(51) Int. Cl.
*B62M 27/02* (2006.01)

(52) U.S. Cl. ...................................... 180/190

(58) Field of Classification Search ................ 180/182, 180/184, 186, 190, 191, 68.4, 68.5, 68.3, 180/9.1, 9.25, 291; 123/50 A, 41.01, 41.33, 123/41.42, 41.57
See application file for complete search history.

(56) References Cited

U.S. PATENT DOCUMENTS

| | | | | |
|---|---|---|---|---|
| 3,835,948 A | * | 9/1974 | Duclo | 180/190 |
| 3,901,335 A | * | 8/1975 | Johnson | 180/190 |
| 4,008,777 A | * | 2/1977 | Juto et al. | 180/68.4 |
| 5,167,294 A | * | 12/1992 | Gessinger | 180/190 |
| 5,232,066 A | * | 8/1993 | Schnelker | 180/190 |
| 5,474,146 A | | 12/1995 | Yoshioka et al. | |
| 5,533,585 A | * | 7/1996 | Kawano et al | 180/190 |
| 5,568,840 A | * | 10/1996 | Nagata et al. | 180/190 |
| 5,660,245 A | * | 8/1997 | Marier et al. | 180/190 |
| 5,662,077 A | * | 9/1997 | Boswell | 123/184.21 |
| 5,899,186 A | | 5/1999 | Kawamoto | |
| 5,899,779 A | | 5/1999 | Hattori | |
| 5,992,552 A | * | 11/1999 | Eto | 180/190 |
| 6,016,655 A | * | 1/2000 | Boswell | 60/324 |
| 6,109,217 A | * | 8/2000 | Hedlund et al. | 123/41.01 |
| 6,170,589 B1 | | 1/2001 | Kawano et al. | |
| 6,322,409 B1 | | 11/2001 | Hattori et al. | |

(Continued)

FOREIGN PATENT DOCUMENTS

JP 52-86615 7/1977

(Continued)

*Primary Examiner*—Anne Marie Boehler
(74) *Attorney, Agent, or Firm*—Nixon & Vanderhye, P.C.

(57) ABSTRACT

A snowmobile four-cycle engine arrangement, includes: a four-cycle engine arranged in an engine compartment formed in the front body of a snowmobile with its crankshaft laid substantially parallel to the body width and having a cylinder case inclined forwards with respect to the vehicle's direction of travel. The engine employs a dry sump oil supplying system and an oil tank separate from the engine is provided. Another snowmobile four-cycle engine arrangement includes: a four-cycle engine having a cylinder head at its top, arranged in the engine compartment and inclined forwards with respect to the vehicle's direction of travel with an intake path provided on the upper portion of the engine body. An intercooler for cooling the intake air is arranged in a tunnel created inside the body frame for accommodating a track belt.

15 Claims, 10 Drawing Sheets

U.S. PATENT DOCUMENTS

| | | |
|---|---|---|
| 6,439,328 B1 | 8/2002 | Vaillancourt et al. |
| 6,508,211 B1 * | 1/2003 | Asano .................... 123/41.01 |
| 6,544,086 B1 * | 4/2003 | Tscherne et al. ......... 440/88 R |
| 2001/0001995 A1 | 5/2001 | Izumi et al. |
| 2002/0000224 A1 | 1/2002 | Tscherne et al. |
| 2002/0027028 A1 * | 3/2002 | Girouard et al. ............ 180/182 |
| 2002/0129984 A1 * | 9/2002 | Wubbolts et al. ........... 180/183 |
| 2003/0041816 A1 * | 3/2003 | Uchida ................... 123/65 PE |

FOREIGN PATENT DOCUMENTS

| | | |
|---|---|---|
| JP | 1997-324649 | 12/1997 |
| JP | 410238359 A | 9/1998 |

\* cited by examiner

SNOWMOBILE FOUR-CYCLE ENGINE ARRANGEMENT

This application is a Divisional of U.S. patent application Ser. No. 09/925,522, filed Aug. 10, 2001, now U.S. Pat. No. 6,561,297, the entire content of which is hereby incorporated by reference in this application.

BACKGROUND OF THE INVENTION (1) Field of the Invention

The present invention relates to an engine arrangement, and in particular relates to an arrangement of a four-cycle engine mounted on a snowmobile.

(2) Description of the Prior Art

Conventionally, small snow vehicles such as snowmobiles have mainly used two-cycle engines. A two-cycle engine is characterized by a relatively simple engine configuration having the advantages of being lightweight and compact and still providing high power. However, two-cycle engines have drawbacks, when compared with four-cycle engines, of emitting a greater amount of exhaust and louder noise with greater vibrations.

The recent worldwide trend demands a silent, clean and environment-conscious engine. Snow vehicle engines are no exception and clean and silent engines have been desired. To fulfil this demand, development of engines for snowmobile into a four-cycle configuration has been studied.

As shown in FIG. 1, a typical conventional snowmobile 200 has a body frame 210 in a monocoque frame configuration, wherein an engine 202 is mounted in a space formed between a track housing 211c and a front suspension housing 211b in the front frame (engine mounting frame) 211. For a two-cycle engine, engine 202 is mounted upright in an engine compartment 206.

If a four-cycle engine is to be put into a snowmobile in the same manner as above, the upright mounting has been difficult because a four-cycle engine has a greater full height compared to a two cycle engine due to its bulky cylinder head and the necessity of an oil pan. Further, since a four-cycle engine needs additional unique parts such as an alternator, supercharger, intercooler, oil filter and the like, it has been very difficult to lay out all these parts in a limited engine compartment space.

FIG. 2 shows a proposal to overcome the above space difficulty. In FIG. 2 an engine 202 is inclined forwards in an engine compartment 206 so as to reduce the full height of engine 202 while the aforementioned components are laid out in the space created by the inclined arrangement of the engine.

On the other hand, in order to enhance the power of a four-cycle engine (which is relatively low in power compared to a two-cycle engine), supercharger(so-called turbocharger) can be provided on the intake side of the engine so as to increase the amounts of air and fuel to be supplied to the combustion chamber, to thereby enhance the engine power.

When the engine has a supercharger, provision of an intercooler in the intake line improves the intake efficiency. However, the position at which the intercooler is attached needs careful thought as to the cooling efficiency of the engine and is affected by the attached position of the supercharger, so that it has been very difficult to design the layout and allot mounting spaces for these components in the engine compartment.

For example, when the intercooler is arranged on the top of the engine, the full height of the engine becomes high so that the center of gravity as well as the body height of the snowmobile become high, hence the result is not preferable.

On the other hand, when the intercooler is arranged in front of the engine, the heavy part is located away from the center of gravity, so that maneuverability decreases. Further, there is another drawback that if the snowmobile collides, the front part of the engine compartment will crush to seriously damage the engine.

For a four-cycle engine, the oil pan, designated at 238, needs to be positioned at the engine bottom. If the engine is of a wet sump type, a large oil pan 238 is needed, which will interfere with the steering shaft, designated at 224, as shown in FIG. 2.

Further, the underside of the engine compartment for a snowmobile serves as a sled sliding over snow, and therefore needs to be closed, which makes maintenance work such as changing oil difficult.

Moreover, when a four-cycle engine with a V-belt type automatic transmission is used for a snowmobile, the engine is used at higher speeds compared to that of a four-wheel vehicle. Therefore, the engine oil increases in temperature due to increased amount of heat from the engine, whereby oil film starvation may occur, leading to damage to the engine.

SUMMARY OF THE INVENTION

The present invention has been devised in view of the above conventional difficulties, it is therefore an object of the present invention to provide a snowmobile four-cycle engine arrangement with which space saving in the engine compartment is achieved and the workability of maintenance is improved. It is another object of the present invention to provide a snowmobile four-cycle engine arrangement with which cooling performance of the air and engine oil supplied to the engine is improved and space saving is achieved without any loss of maneuverability.

In order to achieve the above object, the present invention is configured as follows:

In accordance with the first aspect of the present invention, a snowmobile four-cycle engine arrangement includes: a four-cycle engine arranged in an engine compartment formed in the front body of a snowmobile with its crankshaft laid substantially parallel to the body width and having a cylinder portion inclined forwards with respect to the vehicle's direction of travel, the engine employing a dry sump oil supplying system; and an oil tank provided in the engine compartment, separately from the engine.

In accordance with the second aspect of the present invention, the snowmobile four-cycle engine arrangement having the above first feature is characterized in that the oil tank is arranged in front of the engine and on the top of a front suspension housing which is projected upwards from the bottom of the engine compartment.

In accordance with the third aspect of the present invention, the snowmobile four-cycle engine arrangement having the above first feature is characterized in that the oil tank is arranged in the rear of the engine and on the upper face of a track housing which is projected upwards from the bottom of the engine compartment.

In accordance with the fourth aspect of the present invention, the snowmobile four-cycle engine arrangement having the above second feature is characterized in that the oil tank is arranged in the rear of the engine and on the upper face of a track housing which is projected upwards from the bottom of the engine compartment.

In accordance with the fifth aspect of the present invention, the snowmobile four-cycle engine arrangement having the above first feature is characterized in that the engine compartment has an opening port with a mating openable and closable lid element, at its bottom for creating communication between the inside of the engine compartment and the external space, at a position opposing the bottom of the oil pan of the engine.

In accordance with the sixth aspect of the present invention, the snowmobile four-cycle engine arrangement having the above second feature is characterized in that the engine compartment has an opening port with a mating openable and closable lid element, at its bottom for creating communication between the inside of the engine compartment and the external space, at a position opposing the bottom of the oil pan of the engine.

In accordance with the seventh aspect of the present invention, the snowmobile four-cycle engine arrangement having the above third feature is characterized in that the engine compartment has an opening port with a mating openable and closable lid element, at its bottom for creating communication between the inside of the engine compartment and the external space, at a position opposing the bottom of the oil pan of the engine.

In accordance with the eighth aspect of the present invention, the snowmobile four-cycle engine arrangement having the above fourth feature is characterized in that the engine compartment has an opening port with a mating openable and closable lid element, at its bottom for creating communication between the inside of the engine compartment and the external space, at a position opposing the bottom of the oil pan of the engine.

In accordance with the ninth aspect of the present invention, a snowmobile four-cycle engine arrangement includes: a four-cycle engine having a cylinder head on the top thereof and arranged in an engine compartment formed in the front body of a snowmobile with its crankshaft laid substantially parallel to the body width and its engine body inclined forwards with respect to the vehicle's direction of travel; and an intake path on the upper face of the engine body, and is characterized in that a heat exchanger for cooling the engine cooling water, engine oil or air to be supplied to the engine is arranged in the tunnel created inside the body frame for accommodating a track for driving.

In accordance with the tenth aspect of the present invention, the snowmobile four-cycle engine arrangement having the above ninth feature is characterized in that the heat exchanger is disposed in front of the track, with respect to the vehicle's direction of travel, inside the tunnel.

In accordance with the eleventh aspect of the present invention, the snowmobile four-cycle engine arrangement having the above ninth feature is characterized in that an intercooler for cooling the air to be supplied to the engine is put into use as the heat exchanger.

In accordance with the twelfth aspect of the present invention, the snowmobile four-cycle engine arrangement having the above tenth feature is characterized in that an intercooler for cooling the air to be supplied to the engine is put into use as the heat exchanger.

In accordance with the thirteenth aspect of the present invention, the snowmobile four-cycle engine arrangement having the above ninth feature is characterized in that an oil cooler for cooling the engine oil is put into use as the heat exchanger.

In accordance with the fourteenth aspect of the present invention, the snowmobile four-cycle engine arrangement having the above tenth feature is characterized in that an oil cooler for cooling the engine oil is put into use as the heat exchanger.

In accordance with the fifteenth aspect of the present invention, the snowmobile four-cycle engine arrangement having the above ninth feature is characterized in that a radiator for cooling the engine cooling water is put into use as the heat exchanger.

In accordance with the sixteenth aspect of the present invention, the snowmobile four-cycle engine arrangement having the above tenth feature is characterized in that a radiator for cooling the engine cooling water is put into use as the heat exchanger.

In accordance with the seventeenth aspect of the present invention, the snowmobile four-cycle engine arrangement having the above ninth feature is characterized in that an integrated configuration comprised of an oil cooler for cooling the engine oil and a radiator for cooling the engine cooling water is put into use as the heat exchanger.

In accordance with the eighteenth aspect of the present invention, the snowmobile four-cycle engine arrangement having the above tenth feature is characterized in that an integrated configuration comprised of an oil cooler for cooling the engine oil and a radiator for cooling the engine cooling water is put into use as the heat exchanger.

In accordance with the nineteenth aspect of the present invention, the snowmobile four-cycle engine arrangement having the above thirteenth feature is characterized in that a thermostat is interposed in the oil path of the oil cooler.

In accordance with the twentieth aspect of the present invention, the snowmobile four-cycle engine arrangement having the above fourteenth feature is characterized in that a thermostat is interposed in the oil path of the oil cooler.

In accordance with the twenty-first aspect of the present invention, the snowmobile four-cycle engine arrangement having the above seventeenth feature is characterized in that a thermostat is interposed in the oil path of the oil cooler.

In accordance with the twenty-second aspect of the present invention, the snowmobile four-cycle engine arrangement having the above eighteenth feature is characterized in that a thermostat is interposed in the oil path of the oil cooler.

According to the present invention, since the engine employs a dry sump oil supplying system, it is possible to make the engine body low in height. Since the oil tank is provided in the engine compartment, separately from the engine, it is possible to make efficient use of the space inside the engine compartment as well as to provide a compact engine arrangement.

Since the oil tank is arranged in front of the engine, on the upper surface of the front suspension housing, it is possible to attain space saving. Further, this arrangement allows the oil tank to receive little thermal influence from the engine and makes it possible to cool the engine oil effectively from the air flow during running.

Further, since the oil tank is arranged on the top face of the track housing in the rear of the engine, it is possible to achieve space saving as well as to dispose it apart from the heat source of the engine. Further, the oil tank can be cooled by snow powder stirred up during running, so that the engine oil can be cooled efficiently.

Since the engine compartment has an opening port with an openable and closable lid element for creating communication between the inside of the engine compartment and the external space, it is possible to make an access to the engine from the underside of the engine compartment when maintenance such as changing oil is needed, hence improve the workability.

According to the present invention, since the heat exchanger for cooling the engine cooling water, engine oil or air to be supplied to the engine is arranged in the tunnel created inside the body frame for accommodating a track for driving, it is possible to provide a snowmobile four-cycle engine arrangement in which the heat exchanger will not receive any thermal influence from the engine compartment and can be cooled markedly efficiently by snow powder stirred up during running. Further, provision of the heat exchanger outside the engine compartment makes it possible to reduce the engine height so realize deployment of a four-cycle engine. Further, this configuration enhances space saving in the engine compartment and is markedly effective in reducing the body height so avoid any loss of maneuverability.

Since the heat exchanger is disposed in front of the track, with respect to the vehicle's direction of travel, in the tunnel, it is possible to arrange it close to, and approximately below, the engine. Therefore, the connections such as pipes, etc., can be shortened, thus making it possible to simplify the communication paths so reduce the cost.

Since the intercooler for cooling the air to be supplied to the engine is put into use as the heat exchanger, it is possible to efficiently cool the air which has been compressed and sent from the supercharger and hence is high in temperature to thereby improve the engine power.

Since the oil cooler for cooling the engine oil is put into use as the heat exchanger, it is possible to efficiently cool the engine oil which is high in temperature. Therefore, it is possible to prevent oil film starvation hence prevent damage to the engine to thereby maintain the engine in a good running state.

Since the radiator for cooling the engine cooling water is put into use as the heat exchanger, it is possible to efficiently cool the cooling water which is high in temperature. Therefore, it is possible to prevent the engine from overheating so keep the engine in a good running state.

Since the oil cooler for cooling the engine oil and the radiator for cooling the engine cooling water are integrated as the heat exchanger, it is possible to eliminate the necessity of providing an oil cooler and radiator separately hence achieve space saving and reduce the number of parts.

Since a thermostat is interposed in the oil path of the oil cooler, the engine oil can be kept at a proper temperature. Therefore, it is possible to prevent the engine oil from being excessively cooled, hence keep the engine in a good running state.

DESCRIPTION OF THE PREFERRED EMBODIMENTS

The embodiment of the present invention will hereinafter be described in detail with reference to the accompanying drawings.

Figure 1:
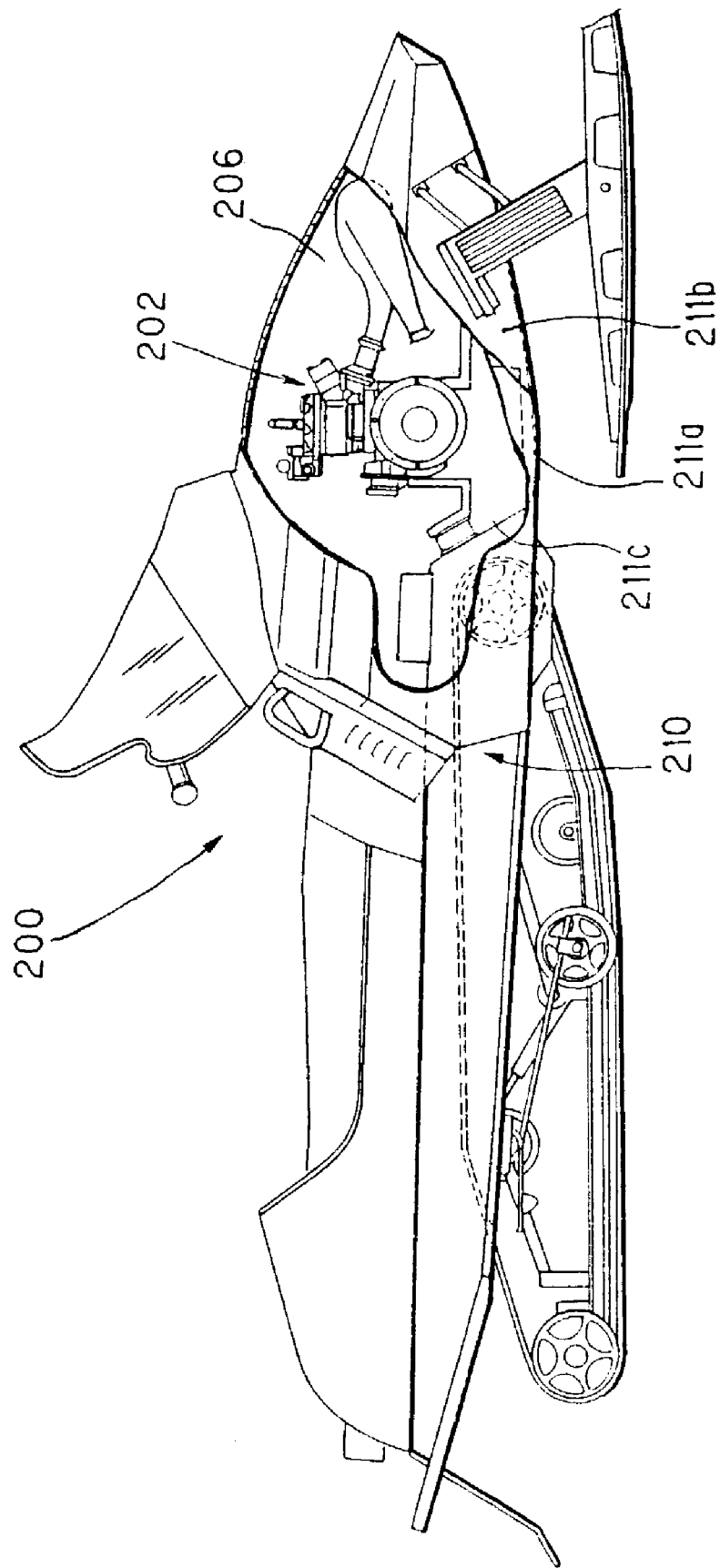
FIG. 1 is a partially sectional side view showing an overall configuration of a snowmobile having a conventional four-cycle engine mounted thereon.
Figure 2:
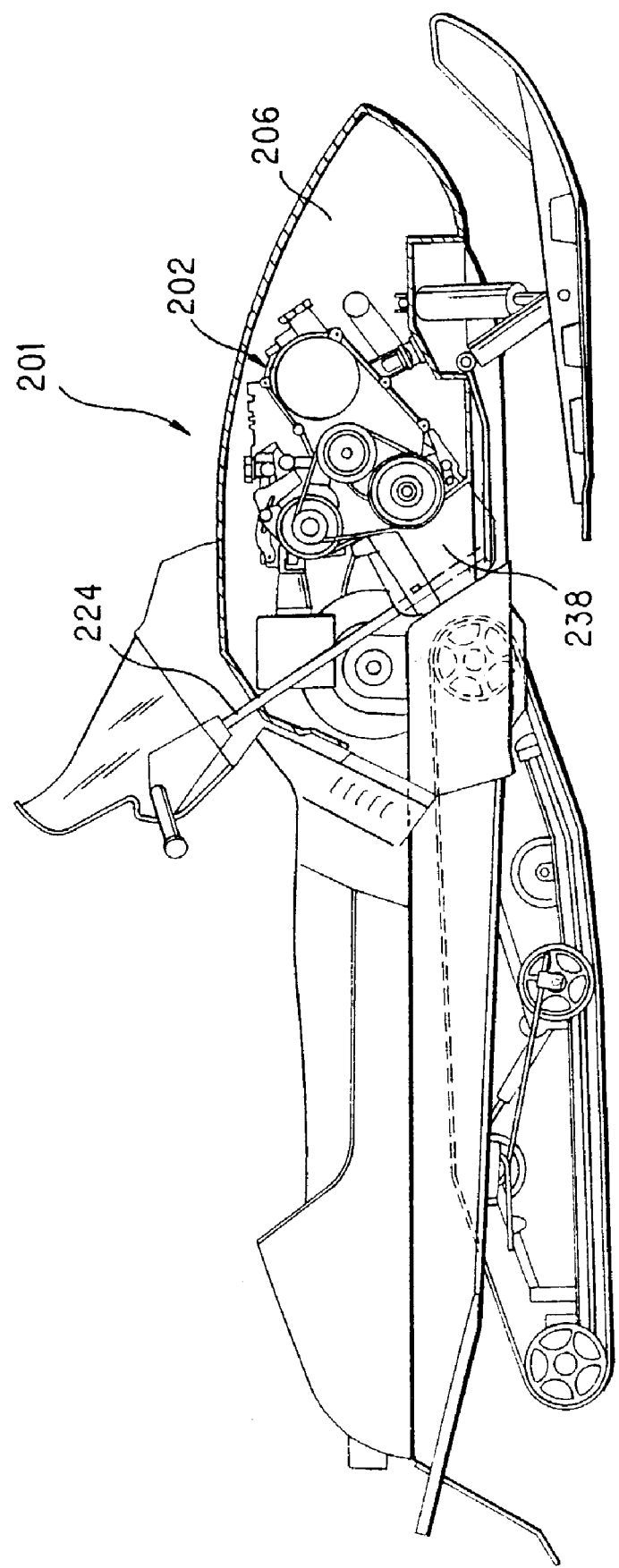
FIG. 2 is an illustrative view showing an overall configuration of a conventional snowmobile four-cycle engine.
Figure 3:
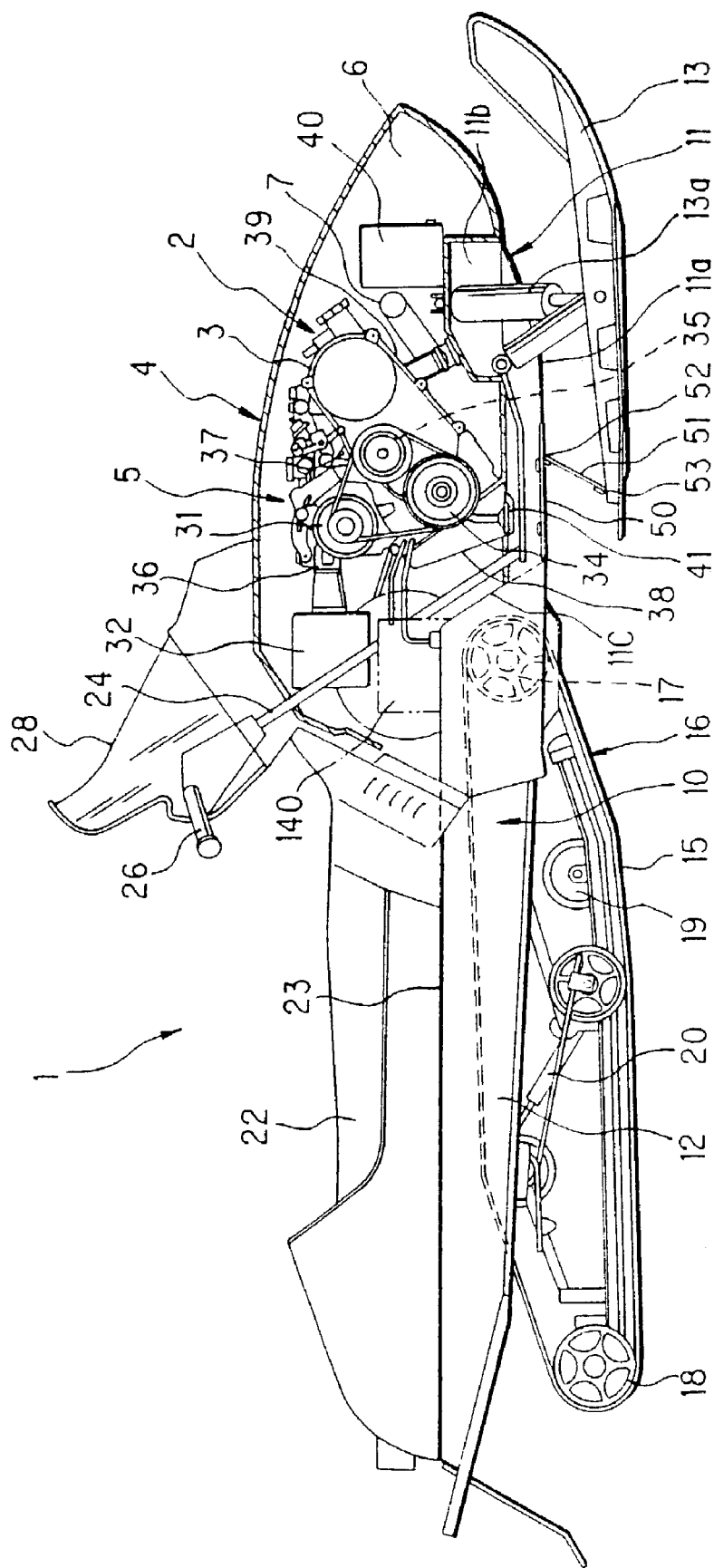
FIG. 3 is a partially sectional side view showing an overall configuration of a snowmobile employing a snowmobile four-cycle engine arrangement in accordance with the embodiment of the present invention.

FIG. 3 is a partially sectional side view showing an overall configuration of a snowmobile employing a snowmobile four-cycle engine arrangement in accordance with the embodiment of the present invention.

A snowmobile four-cycle engine according to this embodiment is arranged as shown in FIG. 3. That is, a four-cycle engine 2 having a cylinder head 3 at the top thereof is arranged in an engine compartment 6 enclosed by a front cover 4 on the front body side of a snowmobile 1 and is inclined forwards with respect to the vehicle's direction of travel with its crankshaft(not shown) laid substantially parallel to the body width and an intake path 5 on the top thereof.

Engine 2 employs a dry sump oil supplying system therein.

Figure 4:
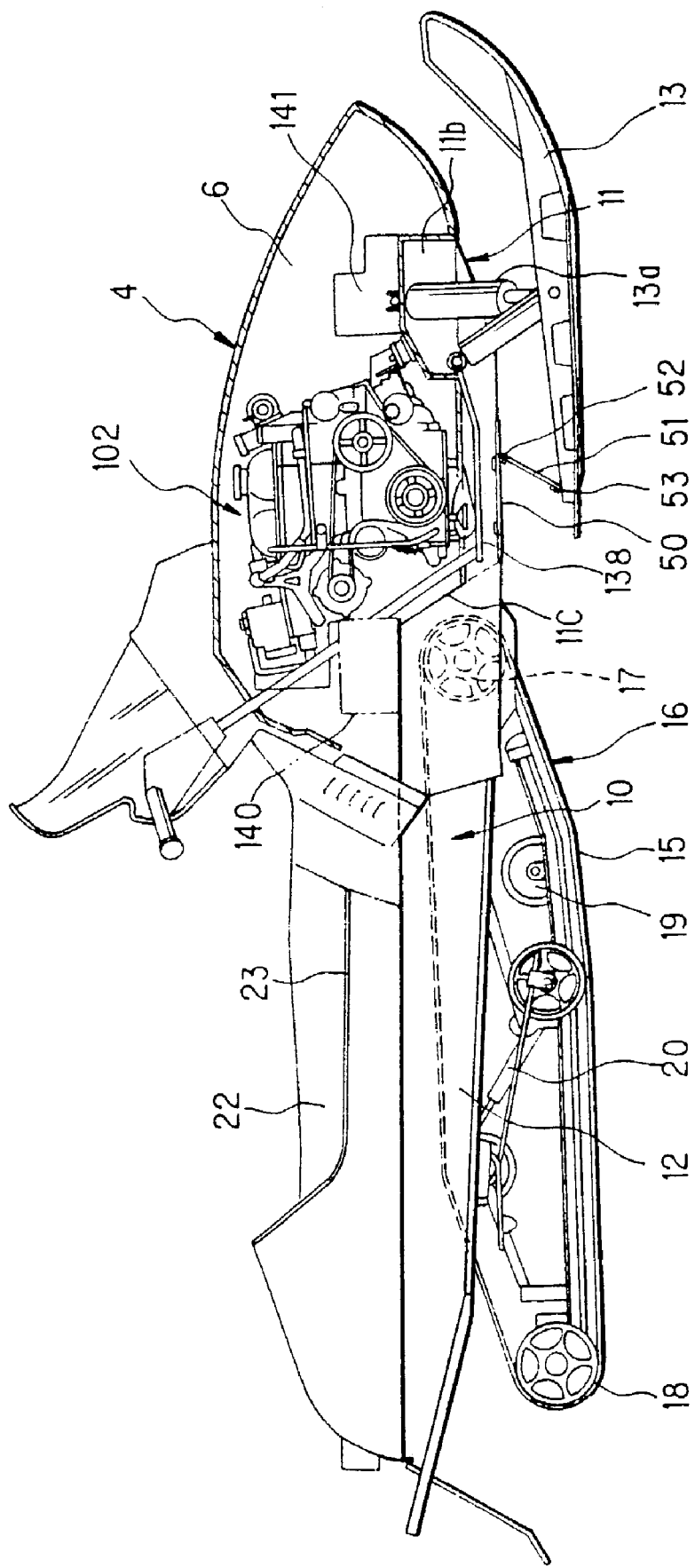
FIG. 4 is a partially sectional plan view showing an overall configuration of a snowmobile of a first variational example of the present embodiment.
Figure 5:
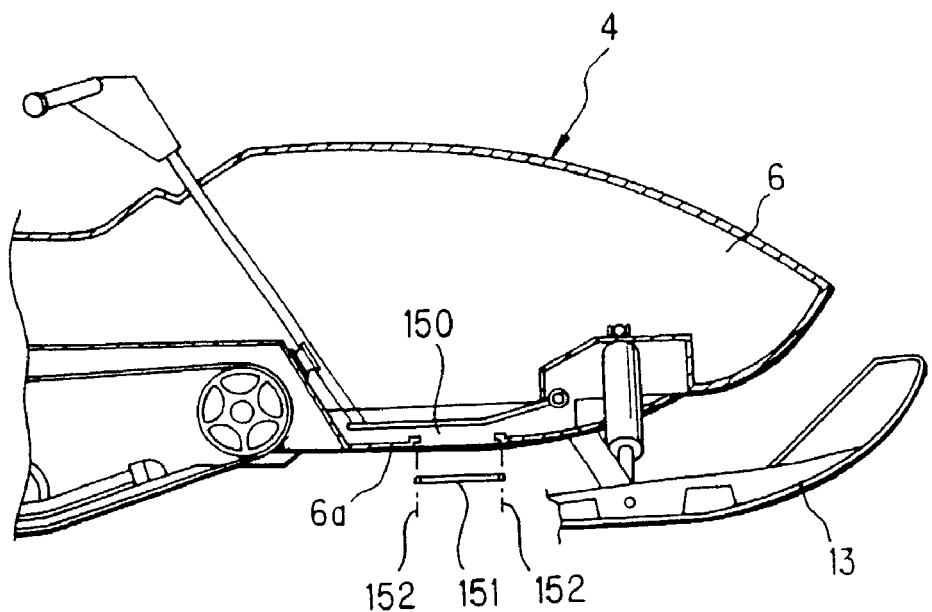
FIG. 5 is a sectional side view showing the bottom arrangement of an engine compartment of a second variational example of the present embodiment.
Figure 6:
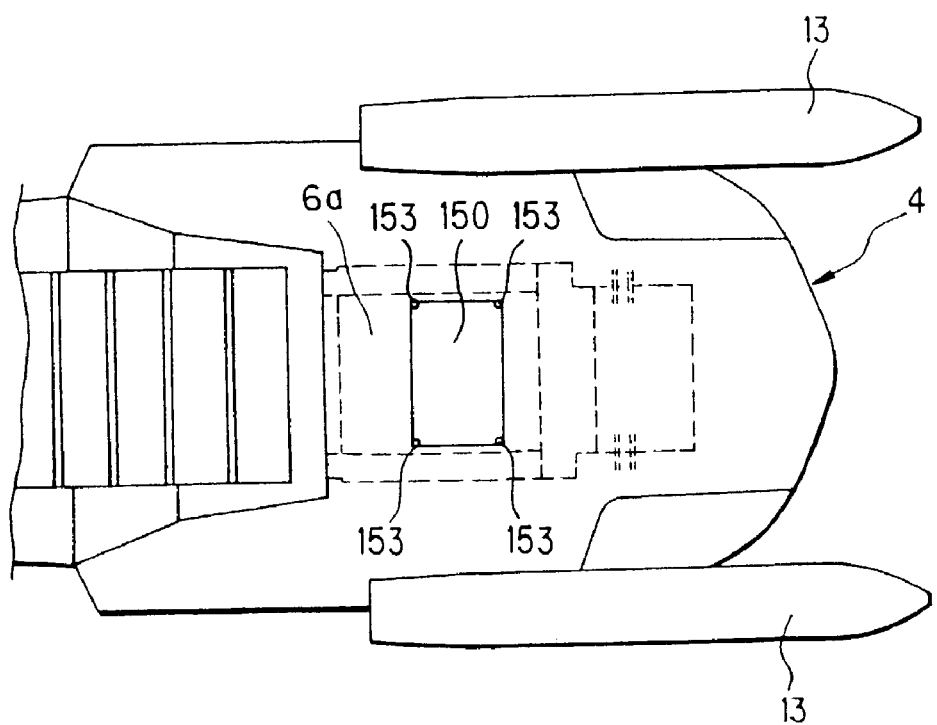
FIG. 6 is a bottom view showing the bottom arrangement of the engine compartment.

Snowmobile 1 has a body frame 10 extending front to rear as shown in FIGS. 3 and 4 with a pair of steerable, ski-type runners 13 arranged on the left and right under the front frame, designated at 11, so as to be turned to the left and right. Arranged under the rear frame, designated at 12, is a tractive crawler 16 including a circulating continuous track belt 15. This crawler 16 comprises a drive wheel 17 arranged at the front end of rear frame 12, an idle wheel 18 arranged at the rear end and a multiple number of middle wheels 19, a suspension mechanism 20 and the track belt 15 wound around these wheels and driven circulatively.

Body frame 10 has a monocoque frame configuration. The front frame (engine mount frame) 11 on which engine 2 is mounted is comprised of a main part 11a as a middle part, a front suspension housing 11b projectively formed upward in front of the main part for accommodating the upper part of front suspension 13a for supporting steerable ski-type runners 13 and a track housing 11c raised upwards and rearwards from the main part 11a for accommodating the upper part of drive wheel 17 of crawler 16. This track housing 11c is continuously and integrally formed with rear frame 12.

The rear frame 12 is extended to the rear with respect to the vehicle's direction of travel and also functions as the cover for accommodating there beneath the whole crawler 16.

A saddle type seat 22 is arranged on the top of rear frame 12 with steps 23 disposed below on both sides of seat 22.

A steering shaft 24 is provided extending upwardly substantially in the center of the body between seat 22 and front cover 4. Handlebars 26 extending horizontally to the left and right and inclined rearwardly are attached at the top of steering shaft 24.

Disposed upright in front of handle bars 26 is a windshield 28, from the base of which front cover 4 is formed in a substantially streamline shape, or in a substantially hull-bottom shape gradually lowering to the front.

Steerable ski-like runners 13 are adapted to be steered via steering shaft 24 by handlebars 26.

As shown in FIG. 3, engine 2 is a four-cycle engine and is arranged at the approximate center of engine compartment 6 inside front cover 4 with its crankshaft(not shown) laid substantially parallel to the body width and its cylinder head 3 inclined at a large angle forwards in the vehicle's direction of travel.

An intake path 5 including a carburetor and throttle body is arranged on the upper side of the engine 2 body, or block. An alternator 31 and air cleaner 32 are arranged to the rear, downstream of the intake path.

A flywheel (not shown) is disposed at one end (on the left side with respect to the vehicle's direction of travel) of the crankshaft and a V-belt type stepless transmission(not shown) incorporating a centrifugal clutch is arranged on the outer side of this flywheel. This stepless transmission is configured so as to transmit drive power to track belt 15 via gears etc., on the receiving side. A brake(not shown) is fitted at the other end of the receiving shaft of the stepless transmission.

Arranged at the other end of the crankshaft (on the right side with respect to the vehicle's direction of travel) is a pulley 34 functioning as a transmission for driving auxiliary equipment so as to drive alternator 31 and a water pump 35.

A starter motor(not shown) is arranged in proximity to the flywheel on the top of the engine 2 body and under intake path 5 such as carburetor, throttle body etc. Disposed on the top of the engine 2 body is an intake manifold 37 which branches the intake path 5 from carburetor 36 into the intake ports of the individual cylinders. The intake system of carburetor 36 and air cleaner 32 from intake manifold 37 is coupled and arranged above the top position of cylinder head 3 and extended to the rear.

This intake system is located under front cover 4 behind the base of windshield 28 from where it extends upward. The top part of cylinder head 3 is accommodated, without interference with other components, in the front inner side of front cover 4 where it gradually lowers toward the front.

As the exhaust system, an unillustrated exhaust manifold is extended from the cylinder case, designated at 39, to the front of engine 2 and is connected to a supercharger 7. An exhaust path is created rearwards along the engine 2 body from this supercharger 7 located at the engine 2 front. That is, supercharger 7 is connected by way of the exhaust path to an unillustrated muffler arranged on one side in the rear of the engine.

As shown in FIG. 3, engine 2 is inclined forwards in engine compartment 6 and mounted on, and along, front frame 11 with an oil pan 38 arranged adjacent to inclined track housing 11*c* and cylinder case 39 arranged adjacent to front suspension housing 11*b*.

An oil tank 40 is arranged on the top of front suspension housing 11*b* in front of and separately from, engine 2.

The engine oil distributed to parts of the engine returns into oil pan 38 and goes to the oil tank 40 via an oil strainer 41 and is re-supplied appropriately to the parts of the engine.

In main part 11*a* constituting part of engine compartment bottom 6*a*, an opening port 50 for maintenance which establishes communication between engine compartment 6 and the external space and a lid element 51 for opening and closing the opening port 50 are provided at a position opposing the bottom of oil pan 38 of engine 2.

This opening port 50 is approximately rectangular-shaped and has a size which allows for maintenance of oil pan 38 from the underside of engine compartment 6.

The one side of lid element 51 is engaged at one side of opening port 50 with a connecting means 52 such as a hinge etc., so that the lid element will be able to pivotally open. A lock mechanism 53 is provided on the other side of lid element 51 so that lid element 51 can be positively fixed to engine compartment bottom 6*a* when opening 50 is closed.

Thus, according to this embodiment, since engine 2 of a dry sump type is arranged inclined forwards with the oil pan 38 at the bottom of engine 2 close to main part 11*a*, it becomes possible to arrange engine 2 in engine compartment 6 in a compact manner.

Since oil tank 40 is arranged in front of cylinder head 3 of engine 2, on the upper surface of front suspension housing 11*b*, which is projected into engine compartment 6, it is possible to provide a space saving engine arrangement by making the best use of the front space of engine 2. Further, this arrangement allows the oil tank to receive little thermal influence from the engine and makes it possible to cool the engine oil effectively from the air flow during travel.

Further, since opening port 50 for maintenance is formed at a position opposing oil pan 38 of engine compartment 6*a* so as to allow maintenance work such as changing oil etc., to be performed outside engine compartment 6, the maintenance performance can be markedly improved.

Provision of opening port 50 in an openable and closable configuration has the advantage of not affecting the travel performance of the snowmobile.

Though in the present embodiment engine 2 is arranged inclined forwards inside engine compartment 6, the present invention should not be limited to this. For example, as a first variational example, an engine 102 may be mounted substantially upright in engine compartment 6 as shown information FIG. 4 with an oil tank 141 arranged on the top surface of front suspension housing 11*b* located in front of the engine. It is understood that this arrangement is a simple extension of the present invention.

Further, in the present embodiment, oil tank 40 is arranged on the top surface of front suspension housing 11*b* in front of engine 2. However, the present invention should not be limited to this. For example, an oil tank 140 may be arranged on the top face of track housing 11*c* behind engine 2 as is indicated by a broken line in FIGS. 3 and 4. In this case, it is possible to provide a space saving arrangement by making effective use of the space over track housing 11*c* behind engine 2. Further, since the oil tank is located apart from the heat source of the engine and can be cooled by snow powder stirred up during running, the engine oil can be cooled efficiently.

Though, in this embodiment, hinged lid element 51 is provided so as to open and close the opening port 50 formed at engine compartment bottom 6*a*, the present invention should not be limited to this. For example, as a second variational example, a lid element 151 having an approximately congruent shape with an opening port 150 formed at the engine compartment bottom 6a can be provided separately. That is, the lid element may be fitted to the opening port 150 and integrally fixed to engine compartment bottom 6a with fasteners 152 such as fastening bolts or the like. In the drawing, reference numeral 153 denotes a threaded hole to secure screw fastener 152.

In this case, opening port 150 may be depressedly formed into the engine compartment 6 by a height approximately equal to the thickness of lid element 151. This makes it possible to arrange the lid element 151 substantially flush with the engine compartment bottom 6a, providing a refined appearance as well as reducing air drag during travel.

Figure 7:
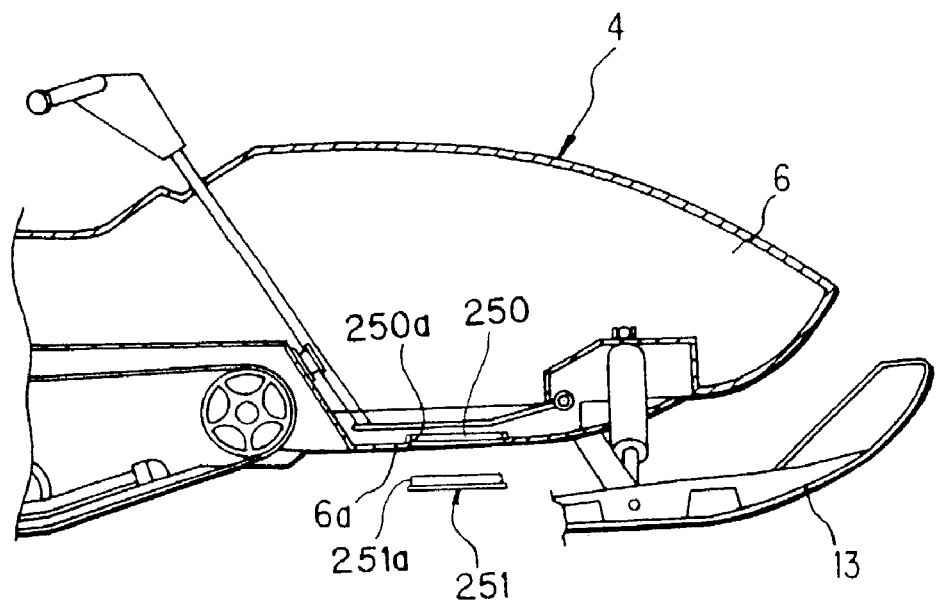
FIG. 7 is a sectional side view showing the bottom arrangement of an engine compartment of a third variational example of the present embodiment.
Figure 8:
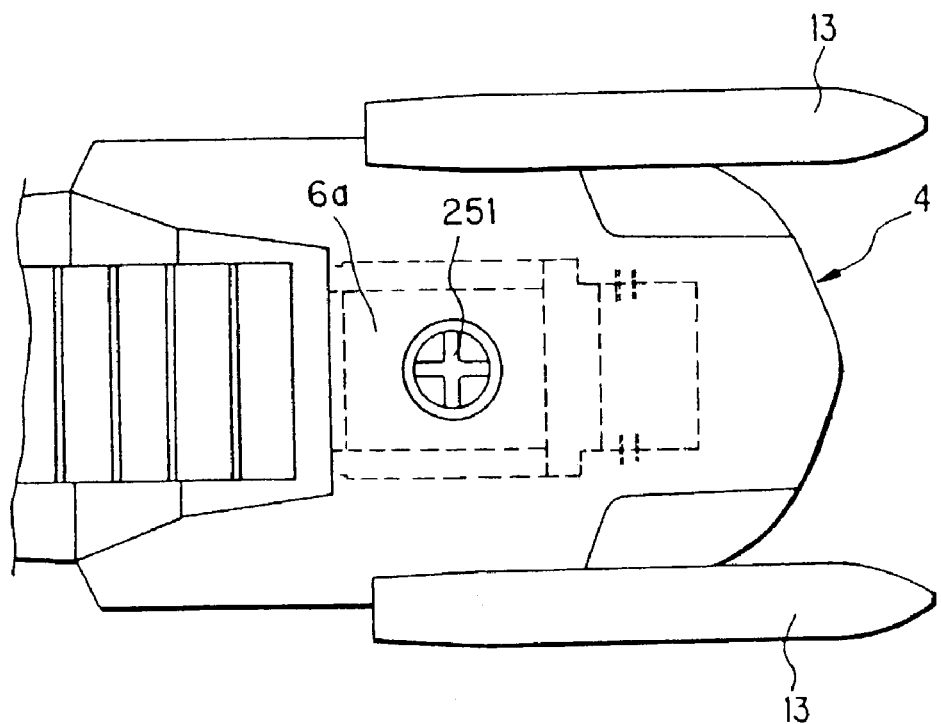
FIG. 8 is a bottom view showing the bottom arrangement of the engine compartment.

As a third variational example, as shown in FIGS. 7 and 8, an opening port 250 with its inner periphery formed with a thread 250a may be formed on engine compartment bottom 6a so as to be projected into engine compartment 6 while a lid element 251 with a thread 251a, mating the thread 250a, formed on its outer periphery may be provided separately. In this case, since no other fastener is needed when lid element 251 is attached to opening port 250, it is possible to improve work performance as well as to use fewer components so reduce the cost.

Next, the second embodiment of the present invention will be described in detail with reference to the drawings.

Figure 9:
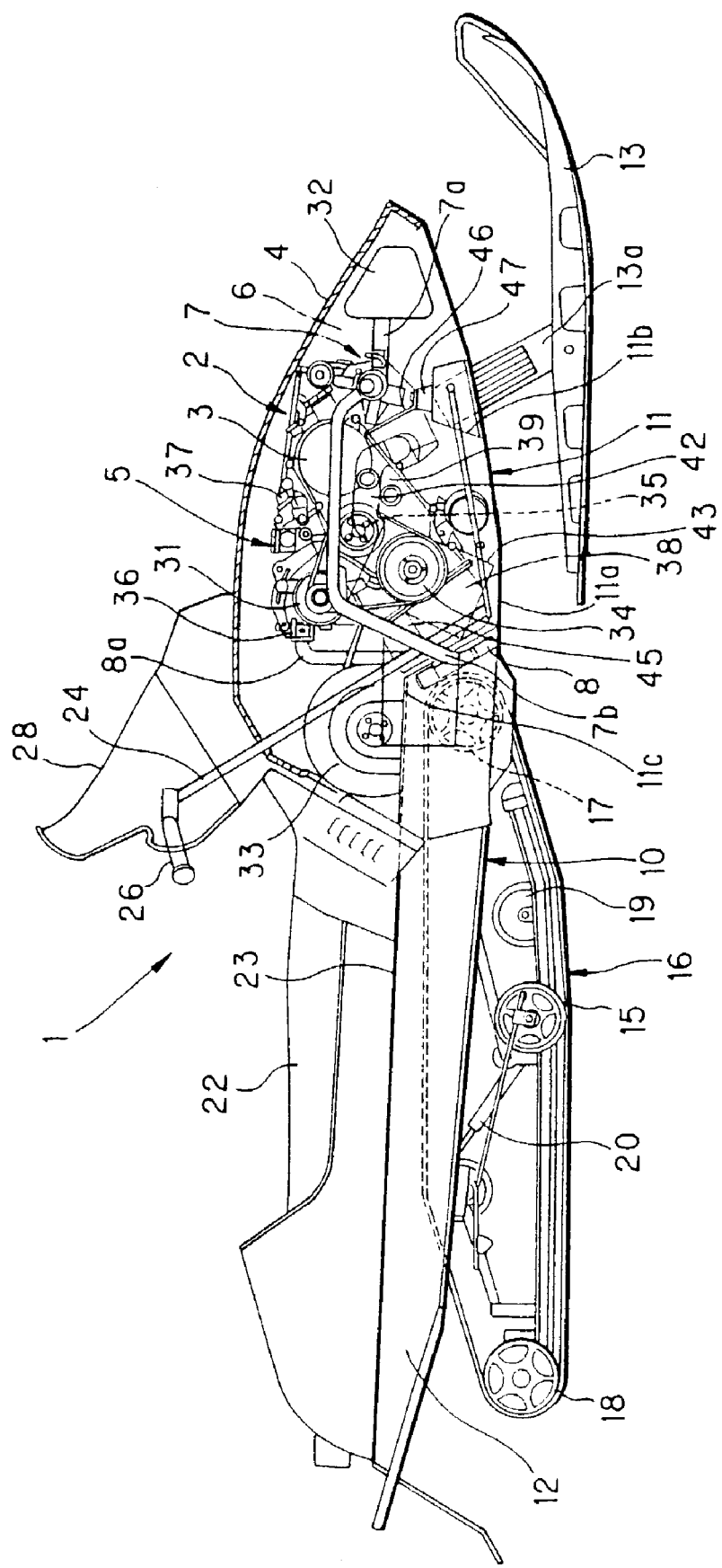
FIG. 9 is a partially sectional side view showing an overall configuration of a snowmobile four-cycle engine in accordance with the second embodiment of the present invention.
Figure 10:
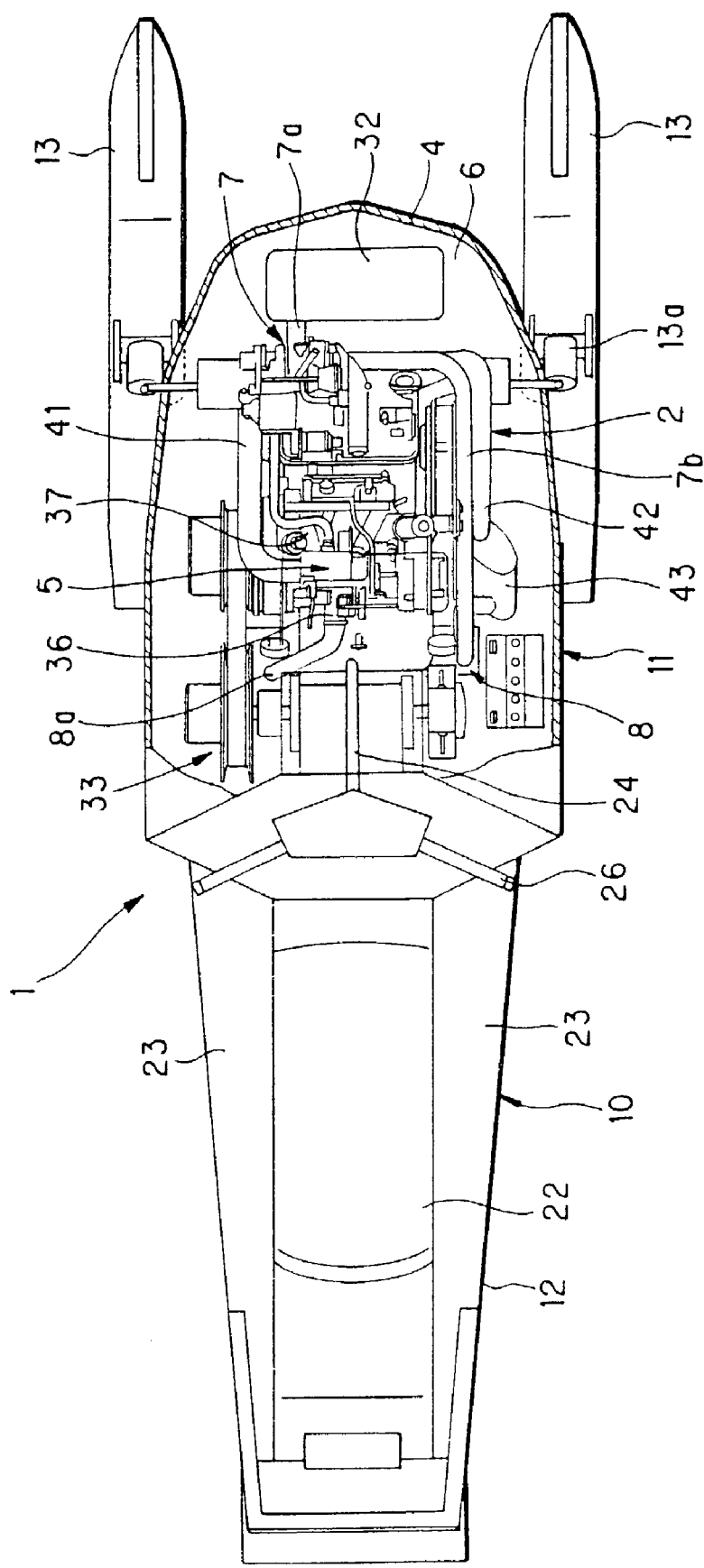
FIG. 10 is a partially sectional plan view showing an overall configuration of a snowmobile four-cycle engine of the second embodiment.

FIG. 9 is a partially sectional side view showing an overall configuration of a snowmobile four-cycle engine in accordance with the second embodiment of the present invention. FIG. 10 is a partially sectional plan view showing an overall configuration of the same snowmobile four-cycle engine.

A snowmobile four-cycle engine according to the second embodiment is arranged as shown in FIGS. 9 and 10. That is, similar to the above first embodiment a four-cycle engine 2(to be referred to hereinbelow as engine) having a cylinder head 3 at the top thereof is arranged in an engine compartment 6 enclosed by a front cover 4 on the front body side of a snowmobile 1 and inclined forwards with respect to the vehicle' direction of travel with its crankshaft(not shown) laid substantially parallel to the body width and an intake path 5 on the top of the inclined engine 2 body. A supercharger (turbocharger) 7 is arranged separately from the engine 2 body while an intercooler 8 for cooling intake air sent from this supercharger 7 to the engine 2 body is arranged at the front side, with respect to the vehicle's direction of travel, inside the tunnel that is formed on the inner side of a body frame 10 in which an aftermentioned drive track belt 15 is accommodated.

Here, the configuration of snowmobile 1 is generally the same as that of the first embodiment except in that the rear frame, designated at 12, has a tunnel-like configuration from the body front to the rear, i.e., with the inner side depressed upwards from the bottom, so as to function as a cover accommodating the whole track belt 15 under it.

As shown in FIGS. 9 and 10, engine 2 is a four-cycle three-cylinder engine having its cylinder head 3 on top and is arranged at the approximate center of engine compartment 6 inside front cover 4 with its crankshaft(not shown) laid substantially parallel to the body width and its cylinder head 3 inclined at a large angle (e.g., more than 45 degrees forwards) in the vehicle's direction of travel. Other arrangement is the same as in the first embodiment.

In the arrangement of the intake system, the parts on the upper side of engine 2 are positioned under front cover 4 behind the base of windshield 28 from where it extends upward while the parts in front of cylinder head 3 are accommodated, so as not to interfere with other components, on the front inner side of front cover 4 where it gradually lowers toward the front.

Disposed on the top of engine 2 is an intake manifold 37 which branches the intake path 5 from carburetor 36 into the intake ports of the individual cylinders.

A supercharger 7 is arranged in front the engine 2 and an air cleaner 32 is disposed at the frontmost space in engine compartment 6.

An intercooler 8 is arranged in proximity to engine 2 at its rear bottom, but outside engine compartment 6 and on the inner side of body frame 10.

One end of supercharger 7 is connected to an intake passage 7a extended forwards so that the supercharger is connected to air cleaner 32 via this intake air passage 7a.

The other end of supercharger 7 is connected to intercooler 8 via an intake air passage 7b which starts from the front side of engine 2 and is bent along the side face of engine 2, in an L-shape as viewed from the top, extended to the rear and bent downwards, in a sectional view, near the engine crankshaft.

An intake air passage 8a is connected to the outlet side of the intercooler 8. This intake air passage 8a extends upwards approximately vertically from the engine 2 bottom and is connected to carburetor 36 arranged over the engine 2.

For air supply to engine 2, air is introduced from the body front via air cleaner 32 into supercharger 7, where the air is compressed and sent to intercooler 8. In the intercooler 8, the air which has become high in temperature through supercharger 7 is cooled and sent to carburetor 36, from where air is supplied to individual cylinders in engine 2 via intake manifold 37.

On the other hand, the exhaust path starts from cylinder case 39 toward the front side of engine 2 and is connected to the inlet side of supercharger 7 via an exhaust manifold 41. The outlet side of supercharger 7 is connected to an exhaust passage 42, which is extended from the front side of the engine 2 body or body to the rear along the engine 2 block and connected to a muffler 43 arranged at one side behind the engine.

As shown in FIG. 9, engine 2 is inclined forwards in engine compartment 6 and mounted on, and along, front frame 11 with an oil pan 38 arranged adjacent to inclined track housing 11c and cylinder case 39 arranged adjacent to suspension housing 11b.

The engine 2 is attached to track housing 11c by a pair of oil-pan side brackets 45 on the rear side and to suspension housing 11b by a pair of cylinder-case side brackets 46 on the front side. Both the oil-pan side brackets 45 and cylinder-case side brackets 46 are angled fittings and arranged left and right. Shock absorbers 47 such as cushion rubber are interposed at the fastening sites to front frame 11 so that the engine is supported floatingly on front frame 11.

According to the second embodiment as above, since intake path 5 is arranged on the upper side of engine 2, supercharger 7 and air cleaner 32 are disposed in front of the engine in engine compartment 6 while intercooler 8 is placed outside engine compartment 6 and inside body frame 10, it is possible to realize a compact engine layout and markedly improve the cooling performance of intercooler 8 by eliminating any thermal effect from engine 2 and cooling it by snow powder stirred up during running, to thereby enhance the charging efficiency of intake air.

By arranging the intake path and exhaust path from the front side toward the rear of engine 2 along its body side, it is possible to improve the cooling effect on the intake and exhaust path by air flow during travel.

Figure 11:
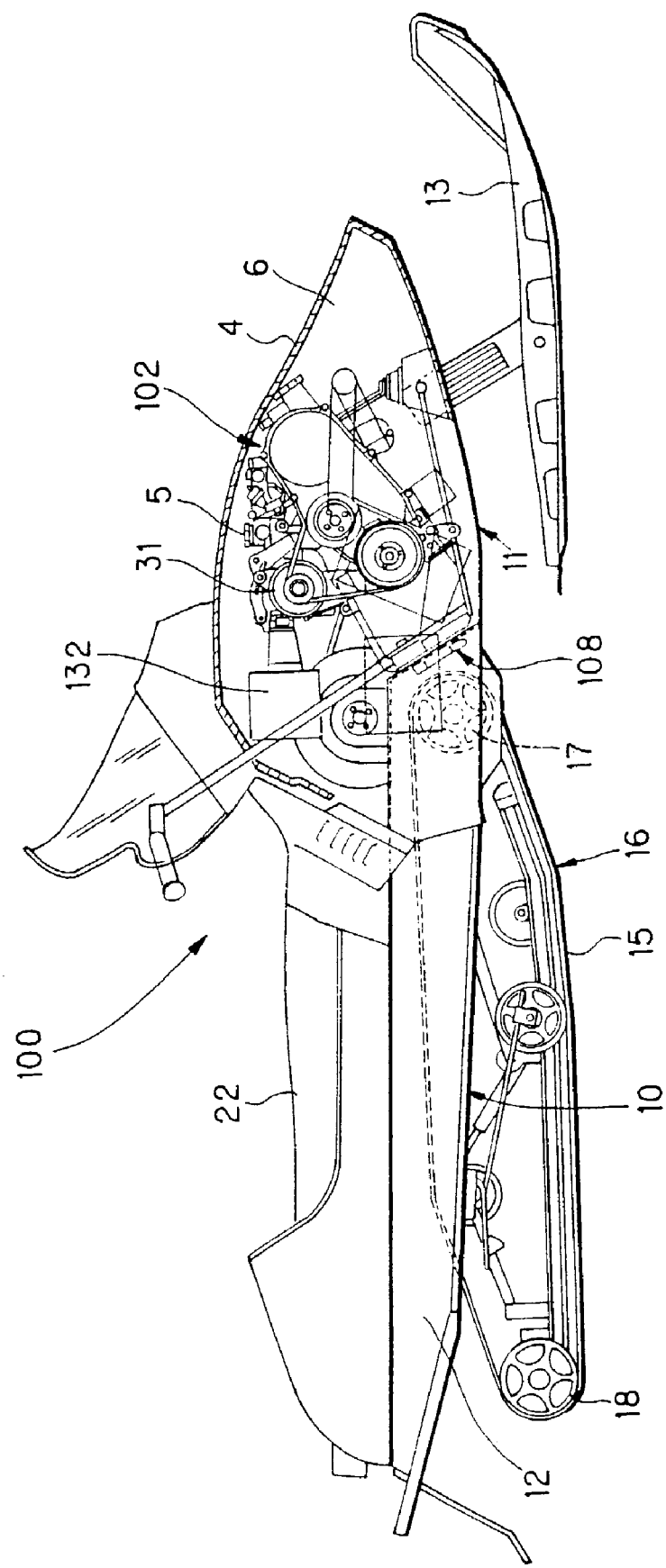
FIG. 11 is a partially sectional side view showing an overall configuration of a snowmobile four-cycle engine of the third embodiment.
Figure 12:
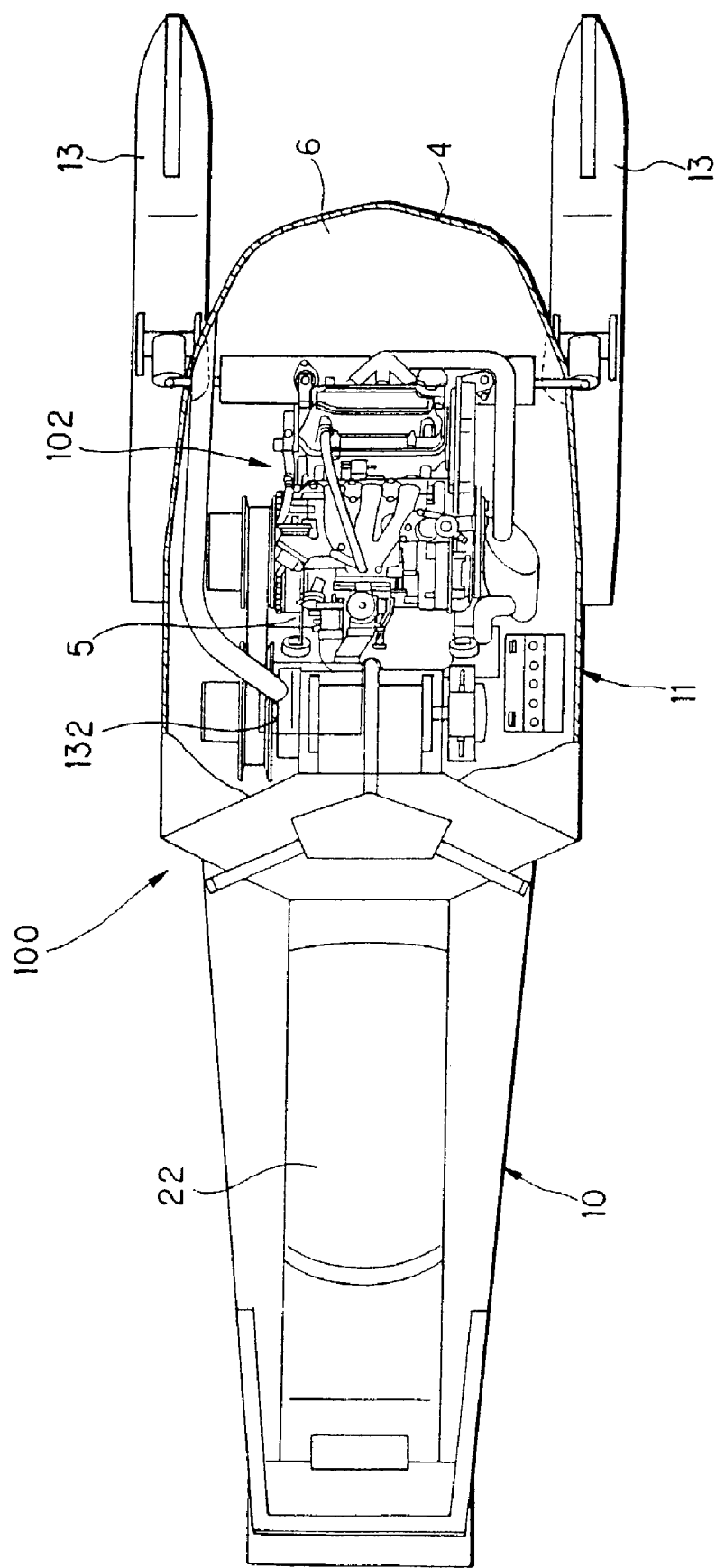
FIG. 12 is a partially sectional plan view showing an overall configuration of a snowmobile four-cycle engine of the third embodiment.

FIG. 11 is a partially sectional side view showing an overall configuration of a snowmobile four-cycle engine of the third embodiment. FIG. 12 is a partially sectional side view showing an overall configuration of the snowmobile four-cycle engine. Here, the parts corresponding to those in the second embodiment are allotted with the same reference numerals without description.

A snowmobile four-cycle engine according to the third embodiment is arranged as shown in FIGS. 11 and 12. That is a four-cycle engine 102(to be referred to hereinbelow as engine) having a cylinder head 3 at the top thereof is arranged in an engine compartment 6 enclosed by a front cover 4 on the front body side of a snowmobile 100 and inclined forwards with respect to the vehicle's direction of travel with its crankshaft(not shown) laid substantially parallel to the body width and an intake path 5 on the top of the inclined engine 2 body.

An oil cooler 108 is arranged at the front side, with respect to the vehicle's direction of travel, in the tunnel that is formed on the inner side of a body frame 10. This oil cooler 108 has a thermostat valve(not shown) between its inlet and outlet oil paths.

An intake path 5 including a carburetor and throttle body is arranged on the upper side of the engine 102 body an alternator 31 and air cleaner 132 being arranged to the rear, downstream of the intake path.

According to the third embodiment as above, since intake path 5 and air cleaner 132 are arranged on the upper side of engine 102, oil cooler 108 is placed outside engine compartment 6 and in the front inner side of body frame 10, it is possible to realize a compact engine layout. Further, since oil cooler 108 is arranged at the front side, with respect to the vehicle's direction of travel, in the tunnel that is formed on the inner side of body frame 10 so that it will not receive any thermal influence from engine 102, it is possible to efficiently cool the engine oil which is high in temperature by snow powder stirred up during travel. Therefore, it is possible to prevent oil film starvation hence prevent damage to the engine to thereby maintain the engine in a good running state.

Further, since a thermostat is interposed in the oil path of the oil cooler 108, it is possible to prevent the engine oil from being excessively cooled so keep the engine in a good running state.

In the above embodiments, intercooler 8 or oil cooler 108 is used as a heat exchanger and arranged inside the tunnel-like hollow inside body frame 10. However, the present invention should not be limited to this arrangement. For example, the radiator may be arranged inside body frame 10. In this case, the engine cooling water can be efficiently cooled so that the engine can be prevented from overheating, thus making it possible to keep the engine in a good running state.

Further, in the present invention, the oil cooler for cooling the engine oil and the radiator for cooling the engine cooling water may be configured integrally and is put into use as the heat exchanger. In this case, it is possible to provide a space saving arrangement and reduce the number of parts because of being needless of providing an oil cooler and radiator separately.

As has been described heretofore, according to the snowmobile four-cycle engine arrangement of the present invention, since the oil tank is arranged in the engine compartment, separately from the engine, it is possible to make the use of a four-cycle engine feasible as well as realizing space saving by making efficient use of the space inside the engine compartment.

Further, since an openable/closable maintenance opening is provided at the bottom of the engine compartment, this arrangement is markedly effective in improving the workability of maintenance when changing oil and the like.

Since a heat exchanger for cooling the engine cooling water, engine oil or air to be supplied to the engine is disposed inside the tunnel that is formed inside the body frame, instead of arranging it inside the engine compartment, it is possible to achieve space saving inside the engine compartment and reduce the engine height, whereby it is possible to realize deployment of a four-cycle engine, which is environment-conscious.

Finally, according to the present invention, it is possible to provide a snowmobile four-cycle engine which is markedly improved in its cooling performance by snow powder stirred up during running.

What is claimed is:

1. A snowmobile comprising:
   a frame comprising:
      an engine compartment formed in a front portion of the frame; and,
      a tunnel which accommodates a driving track;
   a four-cycle engine arranged in the engine compartment, the four-cycle engine having a cylinder portion which is inclined with respect to a direction of travel of the snowmobile, and further provided with an oil pan arranged adjacent to a track housing, and an air intake system disposed on the upper side of the engine;
   a heat exchanger arranged in the tunnel for cooling one of engine oil and engine air to be supplied to the engine.

2. The snowmobile of claim 1, wherein the heat exchanger also cools water to be supplied to the engine.

3. The snowmobile of claim 1, wherein the heat exchanger is disposed a front portion inside the tunnel.

4. The snowmobile of claim 1, wherein the heat exchanger comprises an intercooler.

5. The snowmobile of claim 1, wherein the heat exchanger is an integrated unit which cools both engine oil and water to be supplied to the engine.

6. The snowmobile of claim 5, wherein the heat exchanger is disposed a front portion inside the tunnel.

7. The snowmobile of claim 5, wherein the heat exchanger comprises an intercooler.

8. The snowmobile of claim 1, further comprising means for cooling water to be supplied to the engine, the means for cooling water being arranged in the tunnel.

9. The snowmobile of claim 8, wherein the means for cooling water comprises a radiator.

10. The snowmobile of claim 1, wherein the heat exchanger is an oil cooler, and further comprising a thermostat interposed in an oil path of the oil cooler.

11. The snowmobile of claim 1, wherein the heat exchanger is an air cooler, further comprising:
   an air cleaner disposed in the engine compartment upstream from the engine block in a direction of forward travel of the snowmobile;
   a supercharger which receives and compresses air from the air cleaner;
   a carburetor;
   a first air intake passage which connects the supercharger with an inlet of the heat exchanger;
   a second air intake passage which connects an outlet of the heat exchanger to the carburetor.

12. The snowmobile of claim 11, wherein the second air intake passage has an L-shape viewed from a top of the frame.

13. A snowmobile comprising:
a frame comprising an engine compartment formed in a front portion of the frame;
a tunnel which accommodates a driving track;
a four-cycle engine arranged in the engine compartment;
an intercooler situated outside of the engine compartment and in the tunnel for cooling engine air which travels through the intercooler in the tunnel prior to the air being supplied to the engine;
a supercharger which supplies the engine air to the intercooler, the supercharger being situated in a front portion of the engine compartment.

14. The snowmobile of claim 13, wherein the intercooler is disposed a front portion inside the tunnel.

15. The snowmobile of claim 13, the four-cycle engine has a cylinder portion which is inclined with respect to a direction of travel of the snowmobile.

* * * * *